(12) United States Patent
Hugenbruch et al.

(10) Patent No.: US 9,967,288 B2
(45) Date of Patent: May 8, 2018

(54) PROVIDING A COMMON SECURITY POLICY FOR A HETEROGENEOUS COMPUTER ARCHITECTURE ENVIRONMENT

(71) Applicant: International Business Machines Corporation, Armonk, NY (US)

(72) Inventors: Brian W. Hugenbruch, Binghamton, NY (US); Peter G. Spera, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/933,179

(22) Filed: Nov. 5, 2015

(65) Prior Publication Data

US 2017/0134426 A1    May 11, 2017

(51) Int. Cl.
*G06F 21/62*    (2013.01)
*H04L 9/06*    (2006.01)
*H04L 29/06*    (2006.01)

(52) U.S. Cl.
CPC .................................. *H04L 63/20* (2013.01)

(58) Field of Classification Search
CPC ............................... H04L 63/20; H04L 63/10
See application file for complete search history.

(56) References Cited

U.S. PATENT DOCUMENTS

| | | | |
|---|---|---|---|
| 7,249,374 B1 | 7/2007 | Lear et al. | |
| 7,512,792 B2 | 3/2009 | Arroyo et al. | |
| 7,676,831 B2 | 3/2010 | Britton et al. | |
| 8,028,908 B2 | 10/2011 | Shomo | |
| 8,127,133 B2 | 2/2012 | Cross et al. | |
| 8,732,800 B1 | 5/2014 | Askew | |
| 9,166,988 B1 | 10/2015 | Shin et al. | |
| 9,467,476 B1 | 10/2016 | Shieh et al. | |
| 2003/0196108 A1 | 10/2003 | Kung | |

(Continued)

OTHER PUBLICATIONS

Appendix P, List of IBM Patents or Patent Applications Treated as Related, 2 pages, dated Feb. 9, 2015.

(Continued)

*Primary Examiner* — Izunna Okeke
(74) *Attorney, Agent, or Firm* — Bryan D. Wells (57) ABSTRACT

A common security policy for a heterogeneous computer architecture environment is provided. A configuration of a security policy of a heterogeneous computer architecture is received from a management console. The security policy is stored on a policy server that is communicatively connected, by a management network, to a plurality of hardware platforms of the of the heterogeneous computer architecture. The security policy is distributed to a plurality of policy agents of the heterogeneous computer architecture over the management network. The security policy includes a security policy administrator role that permits management of (i) one or more subjects in a plurality of security zones and (ii) one or more objects in the plurality of security zones. The security policy also includes security zone administrator roles, wherein each security zone administrator role (i) is associated with a respective security zone and (ii) permits management of object(s) in the respective security zone.

14 Claims, 6 Drawing Sheets

(56) References Cited

U.S. PATENT DOCUMENTS

| | | | |
|---|---|---|---|
| 2005/0081062 A1* | 4/2005 | Patrick | G06F 21/6218 726/4 |
| 2005/0229236 A1 | 10/2005 | Devgan et al. | |
| 2006/0242685 A1 | 10/2006 | Heard et al. | |
| 2008/0115205 A1 | 5/2008 | Aaron | |
| 2008/0209501 A1 | 8/2008 | Mayer et al. | |
| 2008/0244736 A1 | 10/2008 | Lampson et al. | |
| 2009/0265755 A1 | 10/2009 | Hamilton, II et al. | |
| 2010/0042722 A1 | 2/2010 | Klissner | |
| 2010/0107215 A1 | 4/2010 | Bechtel et al. | |
| 2011/0013776 A1* | 1/2011 | McAlister | H04L 63/105 380/283 |
| 2011/0072486 A1 | 3/2011 | Hadar et al. | |
| 2011/0099602 A1 | 4/2011 | Apparao et al. | |
| 2011/0138442 A1 | 6/2011 | Vinberg et al. | |
| 2011/0238984 A1 | 9/2011 | Roush et al. | |
| 2012/0151209 A1 | 6/2012 | Visnyak et al. | |
| 2012/0222084 A1 | 8/2012 | Beaty et al. | |
| 2013/0262688 A1* | 10/2013 | Kaminsky | G06Q 10/10 709/229 |
| 2013/0283338 A1 | 10/2013 | Kumar et al. | |
| 2013/0332981 A1 | 12/2013 | Paris et al. | |
| 2014/0019617 A1 | 1/2014 | Hadar | |
| 2014/0033267 A1 | 1/2014 | Aciicmez | |
| 2014/0075494 A1 | 3/2014 | Fadida et al. | |
| 2015/0012962 A1 | 1/2015 | Walsh et al. | |
| 2015/0205977 A1* | 7/2015 | Rundle | G06F 21/6218 707/781 |
| 2015/0237073 A1 | 8/2015 | Lang et al. | |
| 2015/0324609 A1 | 11/2015 | Grubel et al. | |
| 2015/0381610 A1 | 12/2015 | Poomachandran et al. | |
| 2016/0373474 A1 | 12/2016 | Sood et al. | |

OTHER PUBLICATIONS

Hugenbruch et al., "Providing a Common Security Policy for a Heterogeneous Computer Architecture Environment", U.S. Appl. No. 15/014,378, filed Feb. 3, 2016, 34 pages.

Liang et al., "A Multiple-Policy supported Attribute-Based Access Control Architecture within Large-scale Device Collaboration Systems", Journal of Networks, vol. 7, No. 3, Mar. 2012, © 2012 Academy Publisher, doi:10.4304/jnw.7.3.524-531, pp. 524-531.

Nabhen et al., "A Policy Based Framework for Access Control", ICICS 2003, LNCS 2836, pp. 47-59, 2003, © Springer-Verlag Berlin Heidelberg 2003.

Squair et al., "A RBAC-based Policy Information Base", Sixth IEEE International Workshop on Policies for Distributed Systems and Networks, 2005, pp. 1-10, DOI: 10.1109/POLICY.2005.2.

Appendix P, List of IBM Patents or Patent Applications Treated as Related, 2 pages, dated Mar. 21, 2017.

Hugenbruch et al., "Providing a Common Security Policy for a Heterogeneous Computer Architecture Environment", U.S. Appl. No. 15/409,980, filed Jan. 19, 2017, 35 pages.

Hugenbruch et al., "Providing a Common Security Policy for a Heterogeneous Computer Architecture Environment", U.S. Appl. No. 15/410,087, filed Jan. 19, 2017, 35 pages.

* cited by examiner

PROVIDING A COMMON SECURITY POLICY FOR A HETEROGENEOUS COMPUTER ARCHITECTURE ENVIRONMENT

TECHNICAL FIELD

The present invention relates generally to the field of computer security and, more particularly, to providing a common security policy for a heterogeneous computer architecture environment.

BACKGROUND

In general, computer access control includes four phases: authorization; authentication; access approval; and auditing. Authorization is the function of specifying access rights to resources. For example, a human resources staff is normally authorized to access employee records and this policy is usually formalized as access control rules in a computer system. Authentication is the act of confirming the truth of an attribute that is claimed true by an entity (e.g., whether or not the entity is an authorized entity). Access approval is the act that grants or rejects access during access control operation. Authentication and access approval are often combined into a single operation, so that access is approved based on successful authentication, or based on an anonymous access token. Authentication methods and tokens can include passwords, biometric scans, physical keys, electronic keys and devices, hidden paths, social barriers, and monitoring by humans and automated systems. Auditing is the act of analyzing a chronological record of operations and/or event to, at least in part, detect security incidents and security violations.

Mandatory access control (MAC) and discretionary access control (DAC) are two types of access controls. In a mandatory access control system, the access control decision is contingent on verifying the compatibility of the security properties of data and the clearance properties of an individual (or a process proxying for the individual). In general, the decision depends on the integrity of metadata that defines the security properties of the data, as well as the security clearance of the individual or process requesting access. Discretionary access control is a type of access control that restricts access to resources based on the identity of an individual (or a process proxying for the individual) and/or a group to which the individual belongs. The access controls are discretionary in the sense that an individual who is authorized to have certain access permissions is capable of passing those permissions to other individuals, unless restrained by mandatory access controls. Accordingly, systems can implement both MAC and DAC simultaneously, where DAC refers to one category of access controls that individuals can transfer among each other, and MAC refers to a second category of access controls that imposes constraints upon the first.

SUMMARY

According to one embodiment of the present invention, a method for providing a common security policy for a heterogeneous computer architecture environment is provided. The method includes: receiving from a management console, by one or more computer processors, a configuration of a security policy of a heterogeneous computer architecture; storing, by one or more computer processors, the security policy on a policy server of the heterogeneous computer architecture, wherein a management network communicatively connects the policy server to a plurality of hardware platforms of the heterogeneous computer architecture; and distributing, over the management network, the security policy to a plurality of policy agents of the heterogeneous computer architecture, wherein: the security policy includes a security policy administrator role, wherein (i) one or more subjects are associated with the security policy administrator role, and (ii) the security policy administrator role permits the one or more subjects that are associated with the security policy administrator role to manage: one or more subjects in a plurality of security zones; and one or more objects in the plurality of security zones; and the security policy includes a plurality of security zone administrator roles, wherein each security zone administrator role (i) is associated with a respective security zone of the plurality of security zones and (ii) permits management of one or more objects in the respective security zone.

According to another embodiment of the present invention, a computer program product for providing a common security policy for a heterogeneous computer architecture environment is provided. The computer program product comprises a computer readable storage medium and program instructions stored on the computer readable storage medium. The program instructions include: program instructions to receive, from a management console, a configuration of a security policy of a heterogeneous computer architecture; program instructions to store the security policy on a policy server of the heterogeneous computer architecture, wherein a management network communicatively connects the policy server to a plurality of hardware platforms of the heterogeneous computer architecture; and program instructions to distribute, over the management network, the security policy to a plurality of policy agents of the heterogeneous computer architecture, wherein: the security policy includes a security policy administrator role, wherein (i) one or more subjects are associated with the security policy administrator role, and (ii) the security policy administrator role permits the one or more subjects that are associated with the security policy administrator role to manage: one or more subjects in a plurality of security zones; and one or more objects in the plurality of security zones; and the security policy includes a plurality of security zone administrator roles, wherein each security zone administrator role (i) is associated with a respective security zone of the plurality of security zones and (ii) permits management of one or more objects in the respective security zone.

According to another embodiment of the present invention, a computer system for providing a common security policy for a heterogeneous computer architecture environment is provided. The computer system includes one or more computer processors, one or more computer readable storage media, and program instructions stored on the computer readable storage media for execution by at least one of the one or more processors. The program instructions include: program instructions to receive, from a management console, a configuration of a security policy of a heterogeneous computer architecture; program instructions to store the security policy on a policy server of the heterogeneous computer architecture, wherein a management network communicatively connects the policy server to a plurality of hardware platforms of the heterogeneous computer architecture; and program instructions to distribute, over the management network, the security policy to a plurality of policy agents of the heterogeneous computer architecture, wherein: the security policy includes a security policy administrator role, wherein (i) one or more subjects are associated with the security policy administrator role, and (ii) the security policy administrator role permits the one or more subjects that are associated with the security policy administrator role to manage: one or more subjects in a plurality of security zones; and one or more objects in the plurality of security zones; and the security policy includes a plurality of security zone administrator roles, wherein each security zone administrator role (i) is associated with a respective security zone of the plurality of security zones and (ii) permits management of one or more objects in the respective security zone.

DETAILED DESCRIPTION

Embodiments of the present invention recognize that computer security policies (e.g., access control policies) are generally implemented on a platform-by-platform basis. In an enterprise environment that includes a plurality of different computing platforms (i.e., different combinations of hardware and software architectures), the enterprise management architecture generally includes a point of management for each computing platform. If, for example, the enterprise environment includes a virtual platform running one or more virtual servers, the access of the virtual servers to resources within the virtual platform and other resources of the enterprise environment is managed and controlled within the virtual platform, as opposed to a single point of management for the enterprise environment as a whole. When implemented in a heterogeneous computer architecture environment, this approach is inefficient because it requires multiple points of management that are implemented on different computing platforms that can require different management tools and techniques. This approach also introduces security risks. If the security policy on any one computing platform is corrupted or breached, the enterprise environment as a whole is at risk.

Embodiments of the present invention provide a common security policy that is managed from a single management point and controls access within a heterogeneous computer architecture environment via a plurality of security zones. The common security policy controls access to both physical and virtual resources. The common security policy also reduces the need for multiple management platforms, tools, and techniques. In addition, embodiments of the present invention minimize the number of access points to the common security policy.

Figure 1:
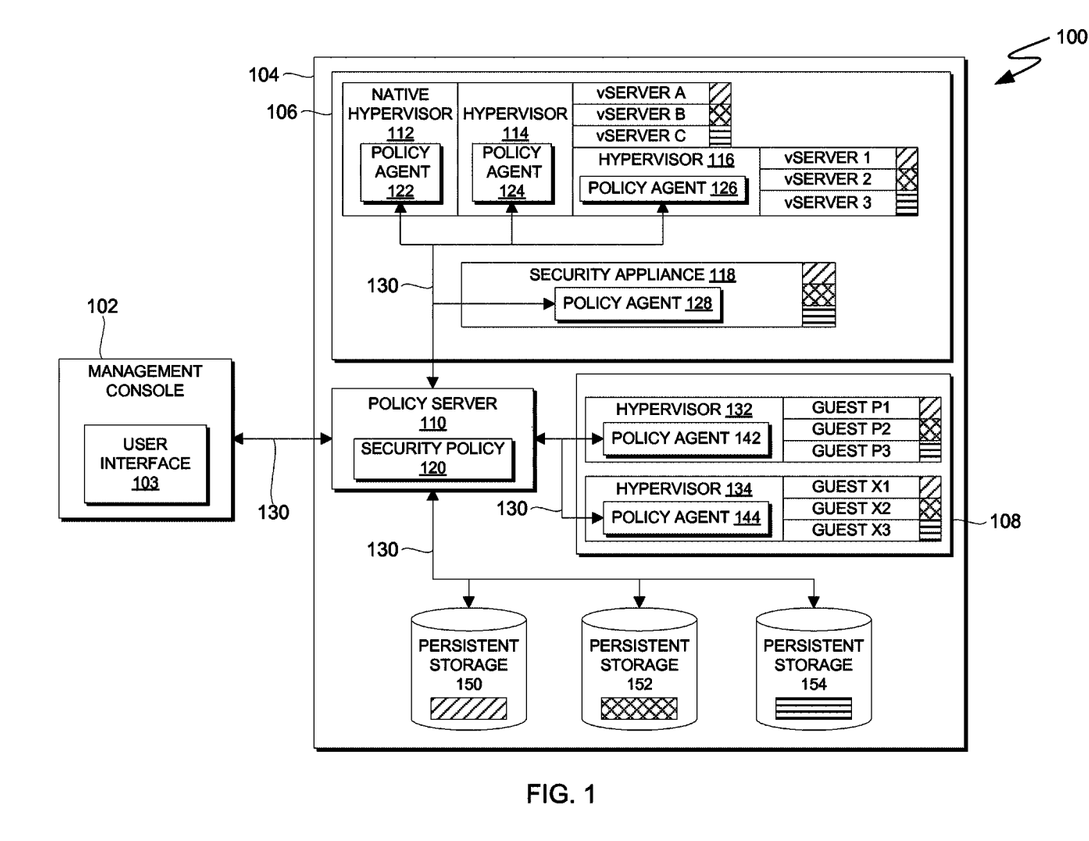
FIG. 1 is a functional block diagram depicting an enterprise computing environment, in accordance with an embodiment of the present invention.

Embodiments of the present invention will now be described in detail with reference to the Figures. FIG. 1 is a functional block diagram depicting a heterogeneous computing environment, in accordance with an embodiment of the present invention. For example, FIG. 1 is a functional block diagram illustrating enterprise computing environment 100. Enterprise computing environment 100 includes heterogeneous computer architecture 104 and management console 102. Heterogeneous computer architecture 104 includes hardware platform 106, hardware platform 108, and policy server 110, interconnected over management network 130. In the embodiment depicted in FIG. 1, heterogeneous computer architecture 104 also includes persistent storage 150, persistent storage 152, and persistent storage 154, communicatively connected to policy server 110 via management network 130.

Figure 4:
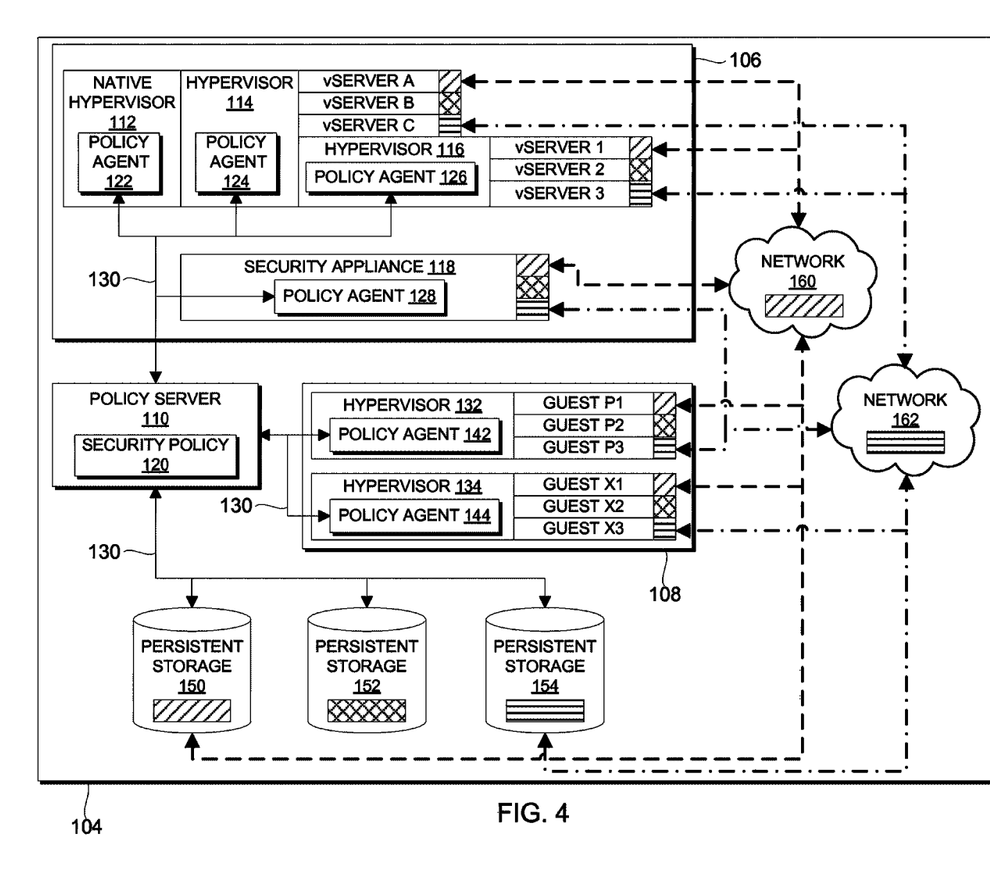
FIG. 4 is a functional block diagram that depicts a system for facilitating information exchange between security zones of a heterogeneous computer architecture, in accordance with an embodiment of the present invention.

Management network 130 can be, for example, a local area network (LAN), a wide area network (WAN) such as the Internet, or a combination of the two, and may include wired, wireless, fiber optic or any other connection known in the art. In general, management network 130 is a combination of connections and protocols through which a "security administrator" can manage security policy 120 and implement security policy 120 on heterogeneous computer architecture 104, as described herein. In the embodiment depicted in FIG. 1, for example, network 130 can be any combination of connections and protocols that will support communications between hardware platform 106, hardware platform 108, policy server 110, management console 102, and persistent storage 150, 152 and 154. It is advantageous to isolate or control access to management network 130 from other networks in heterogeneous computer architecture 104 (e.g., one or more customer network(s) and/or networks 160 and 162, as depicted in FIG. 4). Isolating management network 130 from other networks can reduce the risk that security policy 120 will be corrupted and/or breached.

In various embodiments, each of hardware platform 106, hardware platform 108, and policy server 110 is a computing device that can be a standalone device, a server, a mainframe, a laptop computer, a tablet computer, a netbook computer, a personal computer (PC), or a desktop computer. In some embodiments, one or more of hardware platform 106, hardware platform 108, and policy server 110 represents a computing system utilizing clustered computers and components to act as a single pool of seamless resources. In general, each of hardware platform 106, hardware platform 108, and policy server 110 can be any computing device or a combination of devices with access to one another, as described with respect to FIGS. 1 and 4, and with access to and/or capable of implementing security policy 120. Heterogeneous computer architecture 104 is heterogeneous in that hardware platforms 106 and 108 and policy server 110 can include different types of hardware and software components (e.g., different types of processing units, memory, and/or operating systems). Hardware platform 106, hardware platform 108, and policy server 110 are cooperatively configured and managed via management console 102. In addition, each of hardware platform 106, hardware platform 108, and policy server 110 can include internal and external hardware components, as depicted and described in further detail with respect to FIG. 6.

In the embodiment depicted in FIG. 1, a plurality of hypervisors run on each of hardware platform 106 and hardware platform 108. Native hypervisor 112 is an instrumented hypervisor that runs on and controls the hardware of hardware platform 106. In various embodiments, an instrumented hypervisor is a hypervisor that is able to understand, interpret, enforce, and/or audit security policy 120 (e.g., using code that is added directly or via an exit or plugin to a hypervisor). Hypervisor 114 is an instrumented, nested hypervisor that runs within native hypervisor 112. Hypervisor 116 is an instrumented, nested hypervisor that runs within hypervisor 114. In the embodiment depicted in FIG. 1, each of hypervisor 114 and hypervisor 116 run a plurality of virtual servers. Each of the virtual servers running on hypervisors 114 and 116 is associated with a security zone. Security zones are discussed in greater detail with respect to FIG. 2. In FIG. 1, each security zone is associated with a hash pattern. In FIG. 1, for example, "vSERVER A" and "vSERVER 1" are associated with a first hash pattern that identifies a first security zone, "vSERVER B" and "vSERVER 2" are associated with a second hash pattern that identifies a second security zone, and "vSERVER C" and "vSERVER 3" are associated with a third hash pattern that identifies a third security zone. Similarly, hypervisor 132 and hypervisor 134 run on hardware platform 108. Each of hypervisor 132 and hypervisor 134 are instrumented hypervisors. In the embodiment depicted in FIG. 1, a plurality of guest machines run on each of hypervisor 132 and hypervisor 134. Like the virtual servers running on hypervisors 114 and 116, the guest machines running on hypervisors 132 and 134 are associated with respective security zones. For example, "GUEST P1" and "GUEST X1" are associated with the first security zone, "GUEST P2" and "GUEST X2" are associated with the second security zone, and "GUEST P3" and "GUEST X3" are associated with the third security zone.

In general, hardware platform 106 and hardware platform 108 each include one or more instrumented hypervisors that run, or are configured to run, one or more virtual machines and each include various hardware and/or software components that are associated with one of a plurality of security zones. Accordingly, the number and/or configuration of hypervisors, virtual machines, security zones, and various other hardware and software components of other embodiments of heterogeneous computer architecture 104 can differ from the embodiment depicted in FIGS. 1, 2, and 4 without departing from the scope of the present invention. In addition, the number and/or configuration of hardware platforms in heterogeneous computer architecture 104 can differ from the embodiment depicted in FIGS. 1 and 4 without departing from the scope of the present invention.

In some embodiments of the present invention, management console 102 is a physical computing device that can be a standalone device, a server, a laptop computer, a tablet computer, a netbook computer, a personal computer (PC), or a desktop computer. In such embodiments, management console 102 is communicatively connected to policy server 110 via management network 130. In other embodiments, management console 102 represents a computing system utilizing clustered computers and components to act as a single pool of seamless resources. In yet other embodiments, management console 102 is a virtual machine running on, or a computer program executing on, one of hardware platform 106, hardware platform 108, or policy server 110. In general, management console 102 is a physical or virtual resource that provides user interface 103, through which heterogeneous computing architecture 104 and/or security policy 120 is managed from a single/centralized point in order to minimize access points to the security policy, as described herein. In some embodiments of the present invention, a plurality of management consoles (e.g., a secondary hardware management console in addition to a primary management console) are provided for redundancy. In general, however, the number of management consoles is limited as much as possible in order to minimize access points to the security policy while providing a desired level of redundancy.

User interface 103, which executes locally on management console 102 in the embodiment depicted in FIG. 1, operates to provide a user interface to a user of management console 102. As described herein, the user of management console 102 can be a "security administrator" or one of a plurality of "security zone administrators." User interface 103 further operates to receive user input from a user via the provided user interface, thereby enabling the user to interact with heterogeneous computer architecture 104 via management console 102. More specifically, user interface 103 provides a user interface that enables a user of management console 102 to interact with security policy 120 in order to configure and/or manage security policy 120 as a whole and/or configure and/or manage at least one of a plurality of security zones, depending on the credentials associated with the user. In some embodiments, user interface 103 is stored on management console 102. In other embodiments, user interface 103 is stored on another computing device (e.g., on policy server 110), provided that management console 102 can access user interface 103.

In the embodiment depicted in FIG. 1, security policy 120 is stored on policy server 110. In general, policy server 110 is a physical or virtual server that distributes security policy 120 and updates to security policy 120 to various "policy agents" of heterogeneous computer architecture 104, as described herein. For example, policy server 110 can be a virtual server running on hardware that provides communication, monitoring, and/or diagnostic functions to various components of heterogeneous computer architecture 104. In other embodiments, security policy 120 can reside on another computing device (e.g., management console 102), provided that policy server 110 can access security policy 120 and each of management console 102, hardware platform 106, hardware platform 108, and persistent storage 150, 152, and 154 can access security policy 120 via policy server 110. It is advantageous, however, to store security policy 120 on policy server 110 in order to restrict direct access to security policy 120. If, for example, security policy 120 is stored on management console 102, any user of management console 102 may be able to access security policy 120 directly. In addition, various physical and virtual resources of heterogeneous computer architecture 104 can access security policy 120 via policy server 110, which is "native" to heterogeneous computer architecture 104, without having to communicate to a remote device (e.g., management console 102) in embodiments where security policy 120 is stored on policy server 110.

In general, security policy 120 is a list of rules that controls access and communication within heterogeneous computer architecture 104. Security policy 120 can include resource-based access controls (RBAC) and/or mandatory access controls (MAC). Security policy 120 is set by a "security administrator" via management console 102. Policy server 110 transmits security policy 120 to various policy agents of heterogeneous computer architecture 104. The security administrator and various "security zone administrators" can make updates to security policy 120 via management console 102, as described herein. Updates are similarly transmitted to the various policy agents. In the embodiment depicted in FIG. 1 for example, policy server 110 transmits security policy 120, or updates to security policy 120, to policy agents 122, 124, 126, 128, 142, and 144. Each of the aforementioned policy agents is associated with one or more physical and/or virtual resources of heterogeneous computer architecture 104 (i.e., a "local architecture") and translates security policy 120 into a programmatic code that the respective resource(s) can understand. Secondary enforcement agents (not shown) execute respective programmatic codes to enforce security policy 120 with respect to the "local architectures."

Persistent storage 150, 152, and 154 are data repositories that may be written to and read by various physical and/or virtual resources of heterogeneous computer architecture 104. In the embodiment depicted in FIG. 1, each of persistent storage 150, 152, and 154 is associated with a respective "security zone;" persistent storage 150 is associated with the first security zone, persistent storage 152 is associated with the second security zone, and persistent storage 154 is associated with the third security zones, as indicated by the respective hash patterns. As described herein, objects associated with the same security zone can access and/or communicate with each other. In the embodiment depicted in FIG. 1, for example, "vSERVER A" can read from and write to persistent storage 150, "vSERVER B" can read from and write to persistent storage 152, and "vSERVER C" can read from and write to persistent storage 154. While omitted from FIG. 1 for illustrative simplicity, each of persistent storage 150, 152, and 154 includes a respective policy agent. In some embodiments, persistent storage 150, 152, and 154 can be written to and read by programs and entities outside of enterprise computing environment 100, if permitted by security policy 120, in order to populate the repositories with data.

Figure 5:
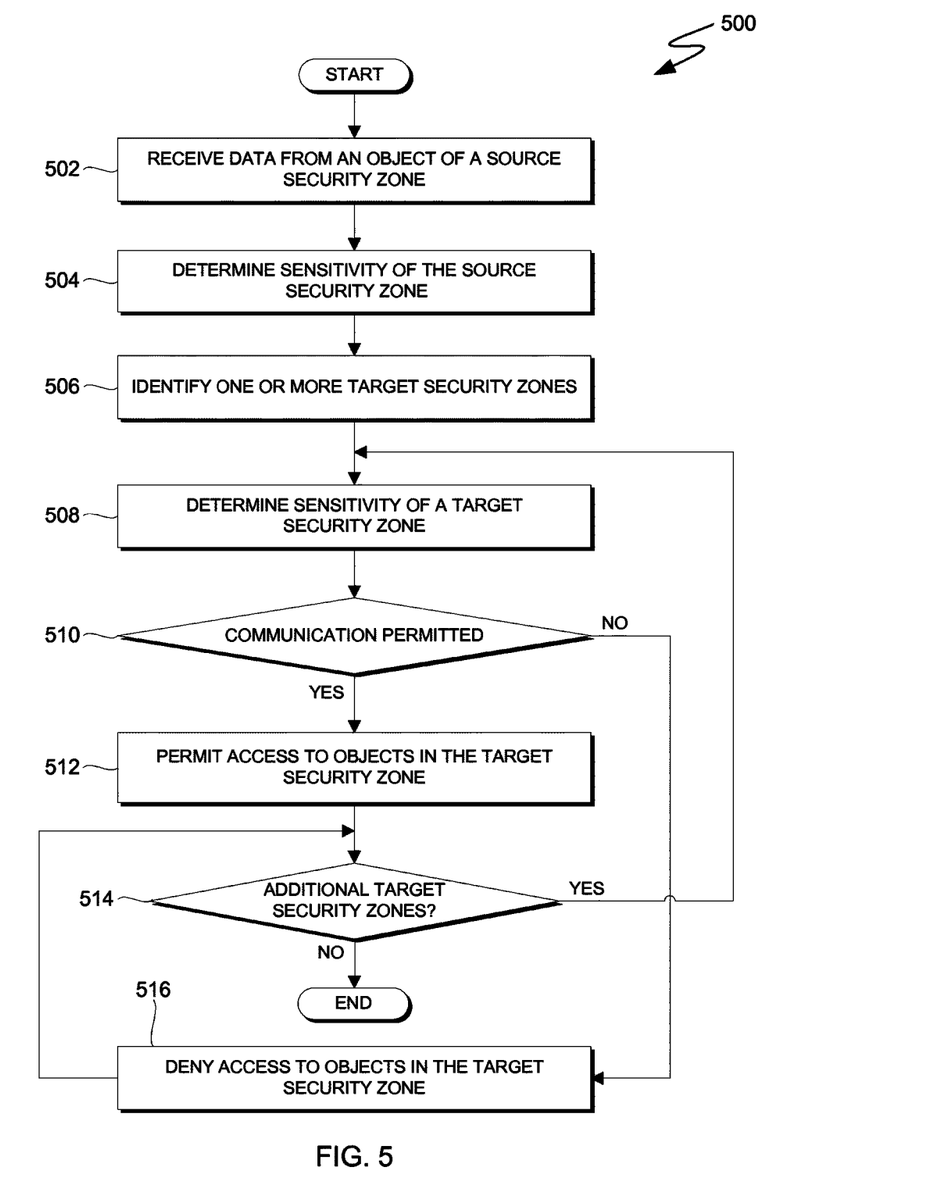
FIG. 5 is a flowchart depicting operations for facilitating information exchange between security zones of a heterogeneous computer architecture, in accordance with an embodiment of the present invention.

As discussed in greater detail with respect to FIGS. 4 and 5, security appliance 118 is a resource of heterogeneous computer architecture 104 that is associated with a plurality of "security zones." Due, at least in part, to the associations with a plurality of security zones, security appliance 118 can make decisions as to whether security policy 120 permits the exchange of information between the respective security zones. In the embodiment depicted in FIG. 1, security appliance 118 is a hardware component of hardware platform 106 that executes programmatic code derived, at least in part, from security policy 120 to provide the functionality previously described. In some embodiments, for example, security appliance 118 is a firewall or another security device of hardware platform 106. In other embodiments, security appliance 118 is a virtual server running on hardware platform 106. In yet other embodiments, security appliance 118 is a physical or virtual resource of a different component of heterogeneous computer architecture 104 (e.g., hardware platform 108) or a separate, discrete component of heterogeneous computer architecture 104 that is communicatively connected to at least policy server 110 via management network 130.

Figure 2:
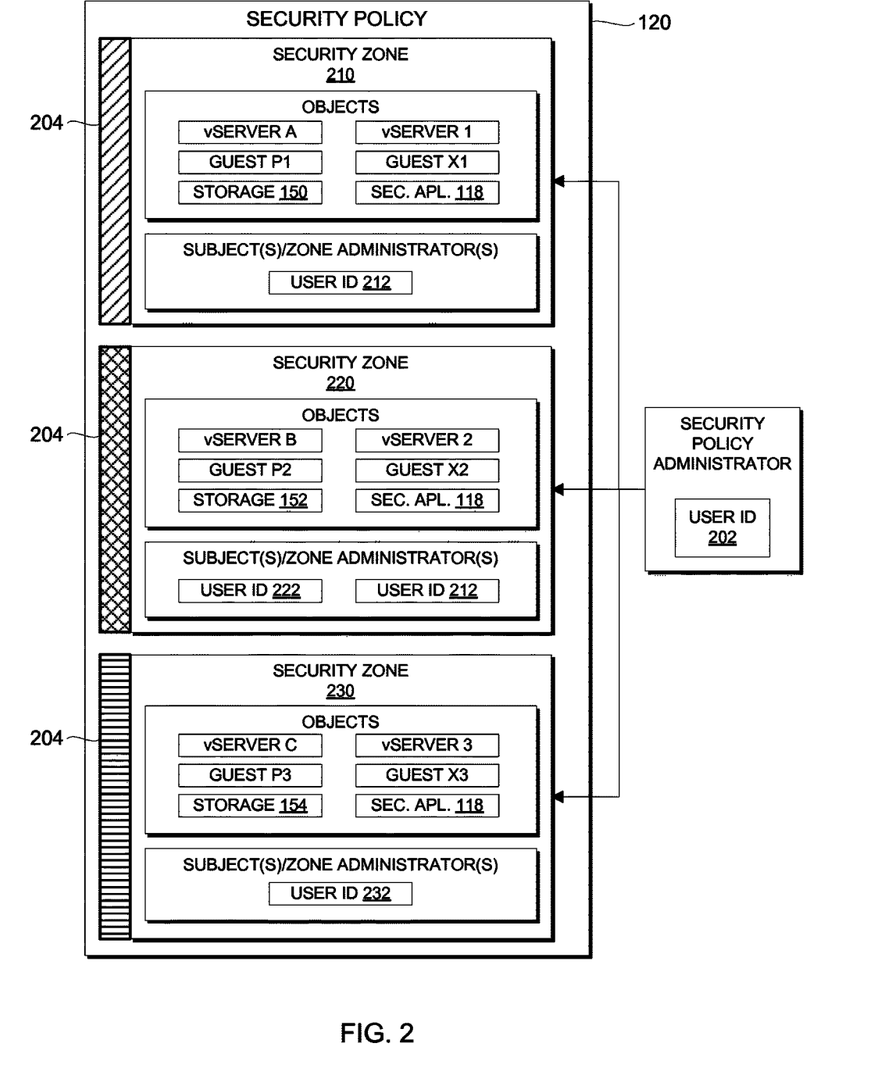
FIG. 2 is a visual representation of a security policy of a heterogeneous computer architecture that includes a plurality of security zones, in accordance with an embodiment of the present invention.

FIG. 2 is a visual representation of a security policy of a heterogeneous computer architecture that includes a plurality of security zones, in accordance with an embodiment of the present disclosure. More specifically, FIG. 2 is a visual representation of security policy 120, which includes the security zones described with respect to FIG. 1.

In the embodiment depicted in FIG. 2, security policy 120 includes security zone 210, security zone 220, and security zone 230. Security zone 210, security zone 220, and security zone 230 respectively correspond to the first security zone, the second security zone, and the third security zone described with respect to FIG. 1. In general, a security zone includes one or more subjects (e.g., one or more user identifiers [users IDs]) and one or more objects (e.g., one or more virtual servers, networks, hypervisors, and/or computer storage devices). In some embodiments, however, one or more security zones do not include any subjects. Security labels 204 distinguish security zones 210, 220, and 230 from one another and are associated with respective subject(s) and/or respective object(s). In general, a security label is any form of data or metadata that enables one or more objects to be associated with one or more subjects and/or one of a plurality of security zones (e.g., via a text file or an XML file including a security content automation protocol). In addition, security labels are mapped to security zones such that user interface 103 of management console 102 can provide a visual representation, at least in part, of security policy 120. In FIGS. 1, 2, and 4, for example, hash patterns are used to represent security labels 204 and differentiate security zones 210, 220, and 230. In other embodiments, colors differentiate security labels 204 (i.e., each security label being represented by a particular color).

Roles are assigned to subjects (i.e., specific user IDs) in order to broaden or limit the ability to manage subjects and/or objects that are governed, at least in part, by security policy 120. For example, "security policy administrator" is a role that is associated with user ID 202 in the embodiment depicted in FIG. 2. In various embodiments, a security policy administrator, such as the entity associated with user ID 202, can configure and manage security policy 120 as a whole (e.g., an entity associated with user ID 202 can create and manage security zones by associating security labels with various objects). Objects associated with a security zone that does not include any subjects are managed, if at all, by a security policy administrator. In some embodiments, only one user ID can be assigned the security policy administrator role. In other embodiments, each user ID of a plurality of user IDs can be assigned the security policy administrator role. In addition, a security policy administrator can assign "security zone administrator" roles to one or more subjects (i.e., associate each of one or more user IDs with one or more security labels). A "security zone administrator" has control over objects that are associated with the same security label(s) as the security zone administrator. In some embodiments, like the embodiment depicted in FIG. 2, a security zone can have a plurality of security zone administrators. For example, user ID 212 has control over objects in security zone 210, users IDs 212 and 222 have control over objects in security zone 220, and user ID 232 has control over objects in security zone 230. While a user ID can be associated with two or more security labels in some embodiments (e.g., user ID 212 is a security zone administrator of security zones 210 and 220), security policy 120 can only associate each object with one security label, with the exception of security appliance 118, as discussed with respect to FIGS. 4 and 5.

In general, security policy 120 is auditable. In various embodiments, for example, an auditor can validate one or more of: the users that are assigned to each security zone; the hierarchy of the security zones; the resources assigned to each security zone; and the security zones that are permitted to exchange information via security appliance 118, as described herein. In addition, modifications and deletions with respect to security policy 120 are logged such that an auditor can validate modifications and/or deletions.

In general, a security zone administrator has the ability to manage, via management console 102, objects that are associated with the same "security label(s)" as the security zone administrator, but cannot bypass security policy 120 (i.e., the overall security policy), force objects that are associated with dissimilar security labels to bypass security policy 120 (e.g., by bypassing security appliance 118), or view or interact with objects that are not associated with the same security label(s) as the security zone administrator. For example, an entity that is associated with user ID 222 cannot manage objects in security zones 210 and 230 and cannot change the security labels associated with objects in security zones 210 and 230. Security policy administrator(s) can, however, configure security policy 120 to permit security zone administrators to assign new objects (i.e., objects not associated with any security label) to their respective security zones and/or disassociate security labels from existing objects within their respective security zones. In some embodiments, a security zone administrator can use security labels to subdivide a security zone into a plurality of "secondary security zones" and assign "secondary security zone administrators" roles to one or more user IDs so that the secondary security zone administrators can manage objects within the respective secondary security zones.

Figure 3:
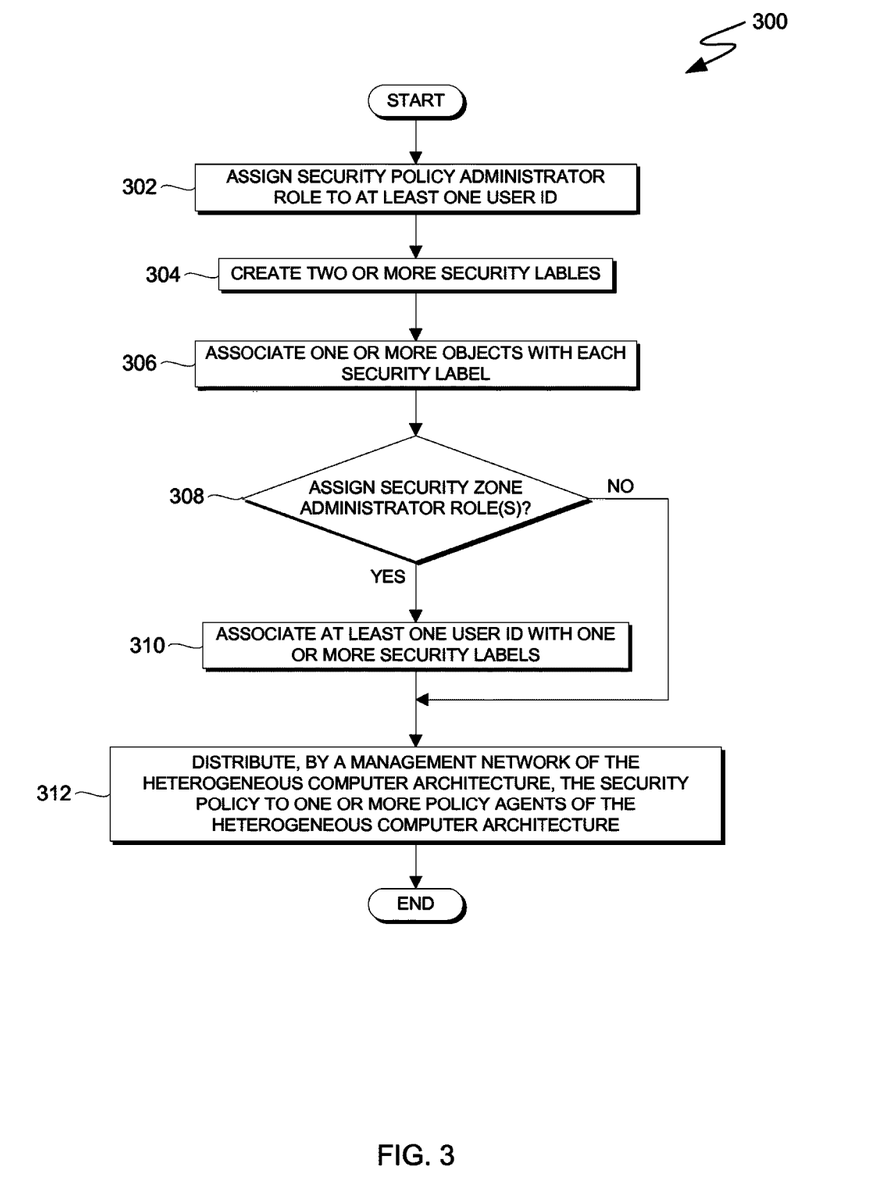
FIG. 3 is a flowchart depicting operations for creating a security policy and deploying the security policy on a heterogeneous computer architecture, in accordance with an embodiment of the present invention.

FIG. 3 is a flowchart depicting operations for creating a security policy and deploying the security policy on a heterogeneous computer architecture, in accordance with an embodiment of the present invention. For example, FIG. 3 is a flowchart depicting operations 300 for creating security policy 120 and deploying security policy 120 on heterogeneous computer architecture 104.

In operation 302, at least one user ID is assigned the role of security policy administrator. The security policy administrator creates two or more security labels (operation 304) and associates one or more objects with each security label in order to create various security zones (operation 306).

If it is determined that one or more security zone administrator roles are to be assigned (e.g., by prompting a user of management console 102 to assign one or more security zone administrator roles and/or based, at least in part, on information entered into user interface 103; decision 308, YES branch), at least one user ID is associated with one or more security labels in accordance with security policy 120, as configured by a user of management console 102 (operation 310). If it is determined that no security zone administrator roles are to be assigned (decision 308, NO branch), operation 312 is performed.

In operation 312, security policy 120 is deployed on heterogeneous computer architecture 104 by distributing, via policy server 110 and management network 130, security policy 120 to one or more policy agents of heterogeneous computer architecture 104 (e.g., policy agents 122, 124, 126, 128, 142, and 144). Updates to and/or revised versions of security policy 120 are similarly deployed on heterogeneous computer architecture 104 when modifications are made to security policy 120 (e.g., objects and/or subjects are added, deleted, or rearranged with respect to the security zones).

FIG. 4 is a functional block diagram that depicts a system for facilitating information exchange between security zones of a heterogeneous computer architecture, in accordance with an embodiment of the present invention. More specifically, FIG. 4 depicts how heterogeneous computer architecture 104 and security appliance 118 can be configured in order to determine whether or not to permit communication between objects of security zone 210 and objects of security zone 230, as depicted in FIGS. 1 and 2.

In the embodiment depicted in FIG. 4, network 160 is a resource of heterogeneous computer architecture 104 that is associated with the security label of security zone 210 (i.e., network 160 is an object of security zone 210). Network 160 can be a local area network (LAN), a wide area network (WAN) such as the Internet, or a combination of the two, and may include wired, wireless, fiber optic or any other connection known in the art. In general, network 160 is a combination of connections and protocols that permit various objects of security zone 210 to communicate with one another, and in some cases, objects of other security zones via security appliance 118. In the embodiment depicted in FIG. 4, for example, network 160 can be any combination of connections and protocols that will support communication between "vSERVER A," "vSERVER 1," "GUEST P1," "GUEST X1," persistent storage 150, and security appliance 118.

Similarly, network 162 is a resource of heterogeneous computer architecture 104 that is associated with the security label of security zone 230 (i.e., network 162 is an object of security zone 230). Network 162 can be a local area network (LAN), a wide area network (WAN) such as the Internet, or a combination of the two, and may include wired, wireless, fiber optic or any other connection known in the art. In general, network 162 is a combination of connections and protocols that permit various objects of security zone 230 to communicate with one another, and in some cases, objects of other security zones via security appliance 118. In the embodiment depicted in FIG. 4, for example, network 162 can be any combination of connections and protocols that will support communication between "vSERVER C," "vSERVER 3," "GUEST P3," "GUEST X3," persistent storage 154, and security appliance 118.

While omitted for illustrative simplicity, heterogeneous computer architecture 104 can include a network that is analogous to networks 160 and 162 in order to permit communication among the objects of security zone 220 and, via security appliance 118, between the objects of security zone 220 and the objects of security zones 210 and/or 230. In addition, the number of networks and/or the configuration of networks 160 and 162 can differ from the embodiment depicted in FIG. 4 without departing from the scope of the present invention.

As previously discussed, security appliance 118 is associated with a plurality of security labels. Because security appliance 118 is associated with a plurality of security labels, security appliance 118 can receive data from more than one security zone. One function of security appliance 118 is to determine whether or not to permit communications between objects of different security zones based, at least in part, on the data routed to security appliance 118. In some embodiments, security appliance 118 makes this determination based, at least in part, on a set of rules that strictly define how information and data can be shared among the security zones defined by the security policy. In other embodiments, security appliance 118 makes this determination based, at least in part, on the relative "sensitivity" of a "source security zone" and a "target security zone." In general, the sensitivity of a security zone is any metric that describes the relative importance of isolating data and/or objects of the security zone from subjects or objects of other security zones. In one example, the sensitivity of a security zone is a number between one and ten, where one is the lowest possible sensitivity and ten is the highest possible sensitivity. If it is assumed that all objects within a security zone are of the same sensitivity, Security appliance 118 permits one or both of (i) a source security zone to write to a target security zone that has higher sensitivity and (ii) and a source security zone to read from a target security zone that has lower sensitivity. If, for example, security zone 210 has a sensitivity of five and security zone 230 has a sensitivity of seven, security appliance 118 will permit an object of security zone 210 (e.g., "vSERVER A") to write to an object of security zone 230 (e.g., persistent storage 154) via network 162 because the sensitivity of security zone 210 is lower than the sensitivity of security zone 230. In other words, objects of a source security zone can write "up" to an object of a first target security zone that has as higher sensitivity but cannot write "down" to an object of a second target security zone that has lower sensitivity. Conversely, objects of a source security zone can read "down" to an object of a first target security zone that has lower sensitivity but cannot read "up" to an object of a second target security zone that has higher sensitivity. In some embodiments, security appliance 118 also permits communication between security zones of equal sensitivity. In various embodiments, one or more of the security policy administrators determine the rules by which security appliance 118 operates by configuring or updating security policy 120.

FIG. 5 is a flowchart depicting operations for facilitating information exchange between security zones of a heterogeneous computer architecture, in accordance with an embodiment of the present invention. For example, FIG. 5 is a flowchart depicting operations 500 of a "secondary enforcement agent" executing on security appliance 118 for determining whether or not to permit communication between an object of security zone 210 and an object of security zone 230, in accordance with security policy 120 as deployed on heterogeneous computer architecture 104.

In operation 502, the secondary enforcement agent executing on security appliance 118 receives data from an object of a source security zone. The secondary enforcement agent queries security policy 120 to determine the "sensitivity" of the source security zone (operation 504). Based, at least in part, on a portion of the received data, the secondary enforcement agent identifies one or more target security zones (operation 506). If, for example, the received data designates one or more target objects, the secondary enforcement agent can determine the target security zone(s) by querying security policy 120 for the security label(s) of the target object(s) and identifying the associated security zone(s). In operation 508, the secondary enforcement agent executing on security appliance 118 determines the sensitivity of one of the one or more target security zones.

If the object of the source security zone is attempting to write to the target security zone and the sensitivity of the target security zone is higher than or equal to the sensitivity of the source security zone (decision 510, YES branch), the secondary enforcement agent permits access to object(s) in the target security zone (operation 512). If the sensitivity of the target security zone is lower than the sensitivity of the source security zone (decision 510, NO branch), the secondary enforcement agent denies access to object(s) in the target security zone (operation 516). In some embodiments, however, the secondary enforcement agent denies access to the object(s) in the target security zone (operation 516) if the sensitivities of the source and target security zones are merely equal.

If the object of the source security zone is attempting to read from the target security zone and the sensitivity of the target security zone is lower than or equal to the sensitivity of the source security zone (decision 510, YES branch), the secondary enforcement agent permits access to object(s) in the target security zone (operation 512). If the sensitivity of the target security zone is higher than the sensitivity of the source security zone (decision 510, NO branch), the secondary enforcement agent denies access to object(s) in the target security zone (operation 516). In some embodiments, however, the secondary enforcement agent denies access to the object(s) in the target security zone (operation 516) if the sensitivities of the source and target security zones are merely equal.

In addition to, or in place of, determining whether or not to permit communication between security zones based, at least in part, on the sensitivities of the security zones, the secondary enforcement agent executing on security appliance 118 can determine whether or not to permit communication between security zones based on strictly defined rules that describe how information can be exchanged between security zones. In some embodiments, for example, a set of strictly defined rules that govern how the secondary enforcement agent enforces security policy 120 on security appliance 118 identify specific target security zone(s) that a source security zone can communicate with and/or how the source security zone can communicate with the target zone(s) (e.g., whether the source security zone can read from and/or write to a specific target security zone). In some embodiments, operations 504 and 508 are omitted and decision 510 is based, at least in part, on the set of strictly defined rules. In other embodiments, decision 510 includes determining whether the set of strictly defined rules prohibit or permit an exchange of information that is otherwise permitted or prohibited, respectively, by rules based, at least in part, on the sensitivities of the source and target security zones. If the set of strictly defined rules prohibit an exchange of information that is otherwise permitted (decision 510, NO branch), the secondary enforcement agent denies access to object(s) in the target security zone (operation 516). If the set of strictly defined rules permit an exchange of information that is otherwise prohibited (decision 510, YES branch), the secondary enforcement agent permits access to object(s) in the target security zone (operation 512).

In response to permitting or denying access to objects in the target security zone, the secondary enforcement agent executing on security appliance 118 determines whether or not the received data designates any additional target security zones (decision 514). If the secondary enforcement agent determines that the received data designates one or more additional target security zones (decision 514, YES branch), the secondary enforcement agent determines the sensitivity of one of the one or more additional target security zones (operation 508). If the secondary enforcement agent determines that the received data does not designate one or more additional target security zones (decision 514, NO branch), operations 500 of the secondary enforcement agent end.

Figure 6:
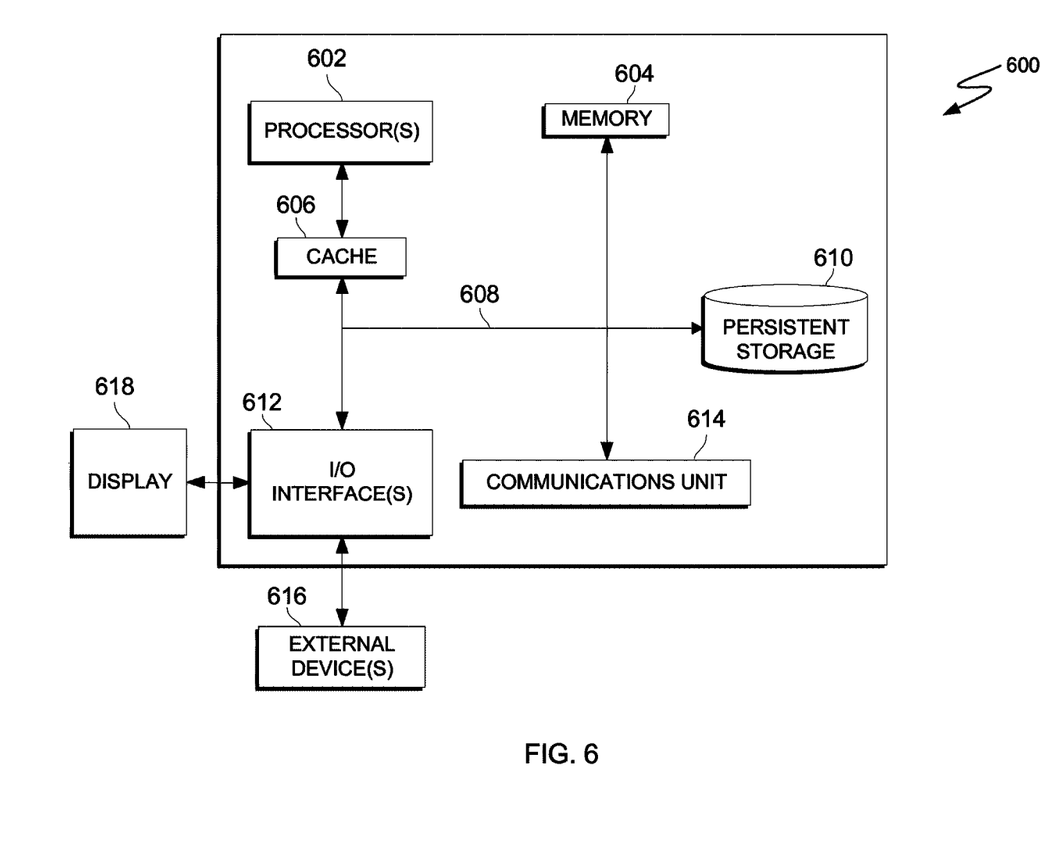
FIG. 6 is a block diagram of components of a computing device in an enterprise computing environment, in accordance with an embodiment of the present invention.

FIG. 6 is a block diagram of components of a computing device in an enterprise computing environment, in accordance with an embodiment of the present invention. In various embodiments, computing system 600 is representative of management console 102 and/or one or more of hardware platform 106, hardware platform 108, or policy server 110 of heterogeneous computer architecture 104. In embodiments where computing system 600 is representative of policy server 110 or management console 102, security policy 120 can reside on computing system 600, as described herein.

It should be appreciated that FIG. 6 provides only an illustration of one implementation and does not imply any limitations with regard to the environments in which different embodiments may be implemented. Many modifications to the depicted environment may be made.

Computing system 600 includes processor(s) 602, cache 606, memory 604, persistent storage 610, input/output (I/O) interface(s) 612, communications unit 614, and communications fabric 608. Communications fabric 608 provides communications between cache 606, memory 604, persistent storage 610, communications unit 614, and input/output (I/O) interface(s) 612. Communications fabric 608 can be implemented with any architecture designed for passing data and/or control information between processors (such as microprocessors, communications and network processors, etc.), system memory, peripheral devices, and any other hardware components within a system. For example, communications fabric 608 can be implemented with one or more buses or a crossbar switch.

Memory 604 and persistent storage 610 are computer readable storage media. In this embodiment, memory 604 includes random access memory (RAM). In general, memory 604 can include any suitable volatile or non-volatile computer readable storage media. Cache 606 is a fast memory that enhances the performance of processor(s) 602 by holding recently accessed data, and data near recently accessed data, from memory 604.

Program instructions and data used to practice embodiments of the present invention may be stored in persistent storage 610 and in memory 604 for execution by one or more of the respective processor(s) 602 via cache 606. In an embodiment, persistent storage 610 includes a magnetic hard disk drive. Alternatively, or in addition to a magnetic hard disk drive, persistent storage 610 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 610 may also be removable. For example, a removable hard drive may be used for persistent storage 610. Other examples include optical and magnetic disks, thumb drives, and smart cards that are inserted into a drive for transfer onto another computer readable storage medium that is also part of persistent storage 610.

Communications unit 614, in these examples, provides for communications with other data processing systems or devices. In these examples, communications unit 614 includes one or more network interface cards. Communications unit 614 may provide communications through the use of either or both physical and wireless communications links. Program instructions and data used to practice embodiments of the present invention may be downloaded to persistent storage 610 through communications unit 614.

I/O interface(s) 612 allows for input and output of data with other devices that may be connected to computing system 600. For example, I/O interface(s) 612 may provide a connection to external device(s) 616 such as a keyboard, keypad, a touch screen, and/or some other suitable input device. External device(s) 616 can also include portable computer readable storage media such as, for example, thumb drives, portable optical or magnetic disks, and memory cards. Software and data used to practice embodiments of the present invention can be stored on such portable computer readable storage media and can be loaded onto persistent storage 610 via I/O interface(s) 612. I/O interface(s) 612 also connect to display 618.

Display 618 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving from a management console, by one or more computer processors, a configuration of a security policy of a heterogeneous computer architecture;
storing, by one or more computer processors, the security policy on a policy server of the heterogeneous computer architecture, wherein a management network communicatively connects the policy server to a plurality of hardware platforms of the heterogeneous computer architecture; and
distributing, over the management network, the security policy to a plurality of policy agents of the heterogeneous computer architecture, wherein:
the security policy includes a security policy administrator role, wherein (i) one or more subjects are associated with the security policy administrator role, and (ii) the security policy administrator role permits the one or more subjects that are associated with the security policy administrator role to manage:
one or more subjects in a plurality of security zones; and
one or more objects in the plurality of security zones;
the security policy includes a plurality of security zone administrator roles, wherein each security zone administrator role (i) is associated with a respective security zone of the plurality of security zones and (ii) permits management of one or more objects in the respective security zone;
the security policy includes a plurality of security label types, each security label type (i) being associated with at least one of the one or more subjects and at least one of the one or more objects of the plurality of security zones and (ii) identifying a respective security zone of the plurality of security zones; and
the security policy identifies a security appliance of the heterogeneous computer architecture that is associated with at least two security label types, and wherein the security policy prohibits, for each of the one or more objects in the plurality of the security zones, with an exception for the security appliance, an association with more than one of the plurality of security label types.

2. The method of claim 1, further comprising:
receiving, by the security appliance, data from a first object of a first security zone of the plurality of security zones, wherein the first security zone is a source security zone;
determining, by the security appliance, a sensitivity of the first security zone;
identifying, by the security appliance, a second object in a second security zone of the plurality of security zones based, at least in part, on the data from the first object, wherein the second security zone is a target security zone;

determining, by the security appliance, the sensitivity of the second security zone; and in response to determining, by the security appliance, that the sensitivity of the second security zone is higher than the sensitivity of the first security zone, permitting the first object to write information to the second object.

3. The method of claim 1, further comprising:

receiving, by the security appliance, data from a first object of a first security zone of the plurality of security zones, wherein the first security zone is a source security zone;

determining, by the security appliance, a sensitivity of the first security zone;

identifying, by the security appliance, a second object in a second security zone of the plurality of security zones based, at least in part, on the data from the first object, wherein the second security zone is a target security zone;

determining, by the security appliance, the sensitivity of the second security zone; and in response to determining, by the security appliance, that the sensitivity of the second security zone is lower than the sensitivity of the first security zone, permitting the first object to read information from the second object.

4. The method of claim 1, further comprising:

receiving, by the security appliance, data from a first object of a first security zone of the plurality of security zones, wherein the first security zone is a source security zone;

identifying, by the security appliance, a second object in a second security zone of the plurality of security zones based, at least in part, on the data from the first object, wherein the second security zone is a target security zone; and in response to determining, by the security appliance, that the first object is permitted to write to the second object based, at least in part, on a set of strictly defined rules that include one or more rules that indicate that objects of the first security zone are permitted to write to objects of the second security zone, permitting the first object to write information to the second object.

5. The method of claim 1, further comprising:

receiving, by the security appliance, data from a first object of a first security zone of the plurality of security zones, wherein the first security zone is a source security zone;

identifying, by the security appliance, a second object in a second security zone of the plurality of security zones based, at least in part, on the data from the first object, wherein the second security zone is a target security zone; and in response to determining, by the security appliance, that the first object is permitted to read from the second object based, at least in part, on a set of strictly defined rules that include one or more rules that indicate that objects of the first security zone are permitted to read from objects of the second security zone, permitting the first object to read information from the second object.

6. The method of claim 1, wherein the security policy permits a subject that is associated with a respective security zone administrator role of the plurality of security zone administrator roles to create one or more secondary security zones in a security zone that is associated with the respective security zone administrator role.

7. A computer program product comprising:

a computer readable storage medium and program instructions stored on the computer readable storage medium, the program instructions comprising:

program instructions to receive, from a management console, a configuration of a security policy of a heterogeneous computer architecture;

program instructions to store the security policy on a policy server of the heterogeneous computer architecture, wherein a management network communicatively connects the policy server to a plurality of hardware platforms of the heterogeneous computer architecture; and program instructions to distribute, over the management network, the security policy to a plurality of policy agents of the heterogeneous computer architecture, wherein:

the security policy includes a security policy administrator role, wherein (i) one or more subjects are associated with the security policy administrator role, and (ii) the security policy administrator role permits the one or more subjects that are associated with the security policy administrator role to manage:

one or more subjects in a plurality of security zones; and one or more objects in the plurality of security zones;

the security policy includes a plurality of security zone administrator roles, wherein each security zone administrator role (i) is associated with a respective security zone of the plurality of security zones and (ii) permits management of one or more objects in the respective security zone;

the security policy includes a plurality of security label types, each security label type (i) being associated with at least one of the one or more subjects and at least one of the one or more objects of the plurality of security zones and (ii) identifying a respective security zone of the plurality of security zones; and the security policy identifies a security appliance of the heterogeneous computer architecture that is associated with at least two security label types, and wherein the security policy prohibits, for each of the one or more objects in the plurality of the security zones, with an exception for the security appliance, an association with more than one of the plurality of security label types.

8. The computer program product of claim 7, the program instructions further comprising:

program instructions to receive, by the security appliance, data from a first object of a first security zone of the plurality of security zones, wherein the first security zone is a source security zone;

program instructions to determine, by the security appliance, a sensitivity of the first security zone;

program instructions to identify, by the security appliance, a second object in a second security zone of the plurality of security zones based, at least in part, on the data from the first object, wherein the second security zone is a target security zone;

program instructions to determine, by the security appliance, the sensitivity of the second security zone;

program instructions to, in response to determining, by the security appliance, that the sensitivity of the second security zone is higher than the sensitivity of the first security zone, permit the first object to write information to the second object; and program instructions to in response, to determining, by the security appliance, that the sensitivity of the second security zone is lower than the sensitivity of the first security zone, permit the first object to read information from the second object.

9. The computer program product of claim 7, the program instructions further comprising:

program instructions to receive, by the security appliance, data from a first object of a first security zone of the plurality of security zones, wherein the first security zone is a source security zone;

program instructions to identify, by the security appliance, a second object in a second security zone of the plurality of security zones based, at least in part, on the data from the first object, wherein the second security zone is a target security zone; and program instructions to, in response to determining, by the security appliance, that the first object is permitted to write to the second object based, at least in part, on a set of strictly defined rules that include one or more rules that indicate that objects of the first security zone are permitted to write to objects of the second security zone, permit the first object to write information to the second object; and program instructions to, in response to determining, by the security appliance, that the first object is permitted to read from the second object based, at least in part, on a set of strictly defined rules that include one or more rules that indicate that objects of the first security zone are permitted to read from objects of the second security zone, permit the first object to read information from the second object.

10. The computer program product of claim 7, wherein the security policy permits a subject that is associated with a respective security zone administrator role of the plurality of security zone administrator roles to create one or more secondary security zones in a security zone that is associated with the respective security zone administrator role.

11. A computer system comprising:
one or more computer processors;
one or more computer readable storage media;
program instructions stored on the one or more computer readable storage media for execution by at least one of the one or more processors, the program instructions comprising:
program instructions to receive, from a management console, a configuration of a security policy of a heterogeneous computer architecture;
program instructions to store the security policy on a policy server of the heterogeneous computer architecture, wherein a management network communicatively connects the policy server to a plurality of hardware platforms of the heterogeneous computer architecture; and
program instructions to distribute, over the management network, the security policy to a plurality of policy agents of the heterogeneous computer architecture, wherein:
the security policy includes a security policy administrator role, wherein (i) one or more subjects are associated with the security policy administrator role, and (ii) the security policy administrator role permits the one or more subjects that are associated with the security policy administrator role to manage:
one or more subjects in a plurality of security zones; and
one or more objects in the plurality of security zones;
the security policy includes a plurality of security zone administrator roles, wherein each security zone administrator role (i) is associated with a respective security zone of the plurality of security zones and (ii) permits management of one or more objects in the respective security zone;
the security policy includes a plurality of security label types, each security label type (i) being associated with at least one of the one or more subjects and at least one of the one or more objects of the plurality of security zones and (ii) identifying a respective security zone of the plurality of security zones; and
the security policy identifies a security appliance of the heterogeneous computer architecture that is associated with at least two security label types, and wherein the security policy prohibits, for each of the one or more objects in the plurality of the security zones, with an exception for the security appliance, an association with more than one of the plurality of security label types.

12. The computer system of claim 11, wherein the program instructions further comprise:

program instructions to receive, by the security appliance, data from a first object of a first security zone of the plurality of security zones, wherein the first security zone is a source security zone;

program instructions to determine, by the security appliance, a sensitivity of the first security zone;

program instructions to identify, by the security appliance, a second object in a second security zone of the plurality of security zones based, at least in part, on the data from the first object, wherein the second security zone is a target security zone;

program instructions to determine, by the security appliance, the sensitivity of the second security zone;

program instructions to, in response to determining, by the security appliance, that the sensitivity of the second security zone is higher than the sensitivity of the first security zone, permit the first object to write information to the second object; and program instructions to in response, to determining, by the security appliance, that the sensitivity of the second security zone is lower than the sensitivity of the first security zone, permit the first object to read information from the second object.

13. The computer system of claim 11, the program instructions further comprising:

program instructions to receive, by the security appliance, data from a first object of a first security zone of the plurality of security zones, wherein the first security zone is a source security zone;

program instructions to identify, by the security appliance, a second object in a second security zone of the plurality of security zones based, at least in part, on the data from the first object, wherein the second security zone is a target security zone; and program instructions to, in response to determining, by the security appliance, that the first object is permitted to write to the second object based, at least in part, on a set of strictly defined rules that include one or more rules that indicate that objects of the first security zone are permitted to write to objects of the second security zone, permit the first object to write information to the second object; and program instructions to, in response to determining, by the security appliance, that the first object is permitted to read from the second object based, at least in part, on a set of strictly defined rules that include one or more rules that indicate that objects of the first security zone are permitted to read from objects of the second security zone, permit the first object to read information from the second object.

14. The computer system of claim 11, wherein the security policy permits a subject that is associated with a respective security zone administrator role of the plurality of security zone administrator roles to create one or more secondary security zones in a security zone that is associated with the respective security zone administrator role.

* * * * *